US009710072B1

(12) United States Patent
Strahle et al.

(10) Patent No.: US 9,710,072 B1
(45) Date of Patent: Jul. 18, 2017

(54) INTERCHANGEABLE INPUT MECHANISMS FOR CONTROL DEVICES

(71) Applicants: Bradley M. Strahle, Crestline, CA (US); Eric B. Fulghum, South Pasadena, CA (US)

(72) Inventors: Bradley M. Strahle, Crestline, CA (US); Eric B. Fulghum, South Pasadena, CA (US)

(73) Assignee: Performance Designed Products LLC, Burbank, CA (US)

( * ) Notice: Subject to any disclaimer, the term of this patent is extended or adjusted under 35 U.S.C. 154(b) by 454 days.

(21) Appl. No.: 13/848,660

(22) Filed: Mar. 21, 2013

Related U.S. Application Data

(60) Provisional application No. 61/621,907, filed on Apr. 9, 2012.

(51) Int. Cl.
*G06F 3/033* (2013.01)
(52) U.S. Cl.
CPC .................................. *G06F 3/033* (2013.01)
(58) Field of Classification Search
CPC .. G05G 1/06; G05G 9/047; G05F 9/00; G06F 3/02; G06F 3/0205; G06F 1/169; G06F 1/3259; G06F 3/0213; G06F 3/033; G06F 3/0338; G06F 1/1624; G06F 1/1662

USPC .......................... 345/156, 168–169, 172, 184
See application file for complete search history.

(56) References Cited

U.S. PATENT DOCUMENTS

| | | | |
|---|---|---|---|
| 5,883,690 A * | 3/1999 | Meyers et al. ................ | 345/161 |
| 2004/0155862 A1* | 8/2004 | Higginson .................... | 345/156 |
| 2005/0255915 A1* | 11/2005 | Riggs et al. ................... | 463/37 |

\* cited by examiner

*Primary Examiner* — Lun-Yi Lao
*Assistant Examiner* — Jarurat Suteerawongsa
(74) *Attorney, Agent, or Firm* — Knobbe, Martens, Olson & Bear LLP

(57) ABSTRACT

Various embodiments described herein are directed toward input mechanisms, for input devices, configured to receive and removably couple to interchangeable elements. Handheld input devices applicable to some embodiments may include, without limitation, computer controllers, video game console controllers, and handheld video gaming devices. Input mechanisms applicable to various embodiments may include, for control sticks (e.g., joysticks or analog sticks operable by a user's finger, such as a thumbstick), buttons, switches, and directional pads. According to some embodiments, an input mechanism is provided comprising a base component, and an interchangeable element configured to removably couple to the base component. Depending on the embodiment, coupling different interchangeable elements to the base component may cause the input mechanism to vary in size, appearance, contour, material, or features provided by the input mechanism.

20 Claims, 11 Drawing Sheets

INTERCHANGEABLE INPUT MECHANISMS FOR CONTROL DEVICES

CROSS-REFERENCE TO RELATED APPLICATION

This application claims the benefit of U.S. Provisional Application Ser. No. 61/621,907, entitled "INTERCHANGEABLE INPUT MECHANISMS FOR HANDHELD CONTROL DEVICES," filed Apr. 9, 2012, which is hereby incorporated herein by reference.

FIELD OF THE INVENTION(S)

The systems and methods described herein relate to input devices and, more particularly, some embodiments relate to customizable input devices having interchangeable components.

DESCRIPTION OF THE RELATED ART

The use of specially configured and customized human input devices, such as video game controllers, keyboards, mice, and trackpads, have a history of use in controlling various devices in many industries. Generally, human input devices (hereafter, simply referred to as "input devices") are configured or customized to meet the needs or preferences of an individual user, often with respect to particular context, application or environment of use. Input devices typically include one or more input mechanisms adapted to receive an input (e.g., physical input) from a user and to translate the input into a corresponding output that may be electrical or mechanical in nature. For instance, an electronic input device, such as a digital handheld controller that is coupled to a processor-based system may receive a physical input from a user (e.g., via an input mechanism) and translate the physical input into a corresponding electrical signal readable by the digital input device.

In the realm of video game consoles (e.g., handheld or other video game consoles) and other video game processor-based systems (e.g., PDAs, laptops, smartphones, etc.), specially configured or customized input devices may include handheld game controllers (e.g., motion-enabled and otherwise), joysticks, analog sticks, digital sticks, directional pads, steering wheels, musical instrument controllers, pads (e.g., dance pads), and the like. Typically, the special configuration or customization of input devices include user preferences relating to ergonomics of the input device, aesthetics of the input device, assignment of buttons or input mechanisms, and the specific application (e.g., first-person shooter video game) with which the input device is being used.

BRIEF SUMMARY OF EMBODIMENTS

Various embodiments of the invention(s) described herein are directed toward input mechanisms for input devices and, more specifically, toward input mechanisms comprising interchangeable elements that enable the input mechanism to be customized/reconfigured according to a user's preferences and/or based on the input mechanism's context of use. Input devices applicable to some embodiments may include, without limitation, computer controllers, video game console controllers, and handheld video gaming devices (e.g., handheld video game consoles, or video game-enabled mobile devices). Other input devices applicable may include those used in commercial or industrial contexts/environments, such as input devices used to control for heavy machinery (e.g., tractors, cranes, etc.). Depending on the embodiment, input mechanisms may take various forms including, for example, control sticks (e.g., joysticks, digital sticks, or analog sticks such as thumbsticks, which are operable by a user's finger), buttons, switches, and directional pads. For some embodiments, a button may be an electronic button, a mechanical button, a trigger, a shoulder button, or a bumper button; a switch may be a rocker switch, a flip switch, or a slide switch; and a directional pad may be a round directional pad or a plus-shaped directional pad. Additionally, the input mechanisms may be digital or analog in nature, and may vary in size, appearance, contour, and material based on the embodiment.

According to various embodiments, an input mechanism (e.g., directional pad input mechanism, or thumbstick input mechanism) is provided, configured to be integrated into an input device (e.g., input device embedded in a handheld video gaming console, or a video game controller), and having an interchangeable element. (e.g., directional pad button, or thumbstick element) removably coupled to a base component of the input mechanism (e.g., at designated coupling point disposed on the base component, such as a socket). The interchangeable element may be coupled to the base component such that the interchangeable element can be decoupled from the input mechanism and optionally replaced by another interchangeable element, which may be similar or different in nature (e.g., possibly an element that is differs in certain aspect in comparison to the element being replaced). Certain embodiment may include an input device incorporating such input mechanisms as those disclosed herein.

According to one embodiment, an input mechanism may comprise: a base component configured to couple to the input device and comprising a coupling mechanism; and a first interchangeable element configured to releasahly attach to the coupling mechanism. The first interchangeable element may be configured to receive, or assist the input mechanism in receiving, an input from a user, ideally, when the first interchangeable element is coupled to the base component. Additionally, the coupling mechanism may be configured to couple the first interchangeable element to the base component such that the first interchangeable element can be decoupled from the base component and a second interchangeable element can be coupled to the base component in place of the first interchangeable element.

Depending on the embodiment, the first interchangeable element and the second interchangeable element differ in appearance, material, physical dimension, shape, or input feature provided. For example, the first interchangeable element may comprise a concave top surface or a convex top contact surface (e.g., adapted to the contour of a user's fingertip). In another example, the first interchangeable element may have a spherical or semi-spherical shape, which may increase accessibility of the input mechanism.

For some embodiments, the base component may be configured to translate the input to a corresponding input instruction provided to the input device. For instance, the base component of an input mechanism may include electrical components (e.g., potentiometers, switches, etc.) operable in translating a physical input (e.g., received a control stick of the input mechanism) into a corresponding electrical signal (e.g., digital or analog signal that is provided to the input device to which the input mechanism is coupled).

For various embodiments, the input mechanism may comprise a joystick, an analog stick, a digital stick, or a directional pad. The input mechanism of some embodiments may comprise a button or a switch. Additionally, for some embodiments, the first interchangeable element may comprise a control stick optimized for use by an appendage of the user's hand (e.g., thumbstick optimized for control by a user's thumb). For example, the control stick may comprise a cradle configured to receive and support the appendage of the user's hand (e.g., thumb or index finger).

For some embodiments, the coupling mechanism may comprise a socket configured to receive a plug disposed on the first interchangeable element. Alternatively, the coupling mechanism may comprise a plug configured to be received by a socket disposed on the first interchangeable element. Further, for some embodiments, the coupling mechanism may comprise an opening configured to reduce or prevent the likelihood of a vacuum forming between the first interchangeable element and the base component as the two are decoupled. By this feature, various embodiments can make it easier for a user to decouple the first interchangeable element from the base component when the user choses to swap the first interchangeable element for another interchangeable element. The coupling mechanism, for various embodiments, may comprise a fastener or the coupling mechanism is friction-based. For example, beads may be disposed on a coupling portion of the first interchangeable element such that the beads contribute to the adhesion between the coupling portion and the base component to which it is coupled.

In certain embodiments, the coupling mechanism may comprise a guide configured to align the first interchangeable element with the base component during coupling (e.g., as the first interchangeable element is being coupled to the base component). Further, for some embodiments, the guide may be further configured to align the first interchangeable element in a first orientation with respect to the base component. For example, once the first interchangeable element has been coupled to the base component, the guide may cause the first interchangeable element to align in certain direction with respect to the base component.

Other features and aspects of the systems, methods and apparatuses described herein will become apparent from the following detailed description, taken in conjunction with the accompanying drawings, which illustrate, by way of example, features in accordance with various embodiments. The summary is not intended to limit the scope of the invention(s), which is defined solely by the claims attached hereto.

BRIEF DESCRIPTION OF THE DRAWINGS

One or more various embodiments described herein are done so in detail with reference to the following figures. The drawings are provided for purposes of illustration only and merely depict typical or embodiments. These drawings are provided to facilitate the reader's understandinn of various embodiments and shall not be considered limiting of the breadth, scope, or applicability of embodiments. It should be noted that for clarity and ease of illustration these drawings are not necessarily made to scale.

Some of the figures included herein illustrate various embodiments of the invention(s) from different viewing angles. Although the accompanying descriptive text may refer to such views as "top," "bottom" or "side" views, such references are merely descriptive and do not imply or require that the invention(s) be implemented or used in a particular spatial or unless explicitly stated otherwise.

Figure 1:
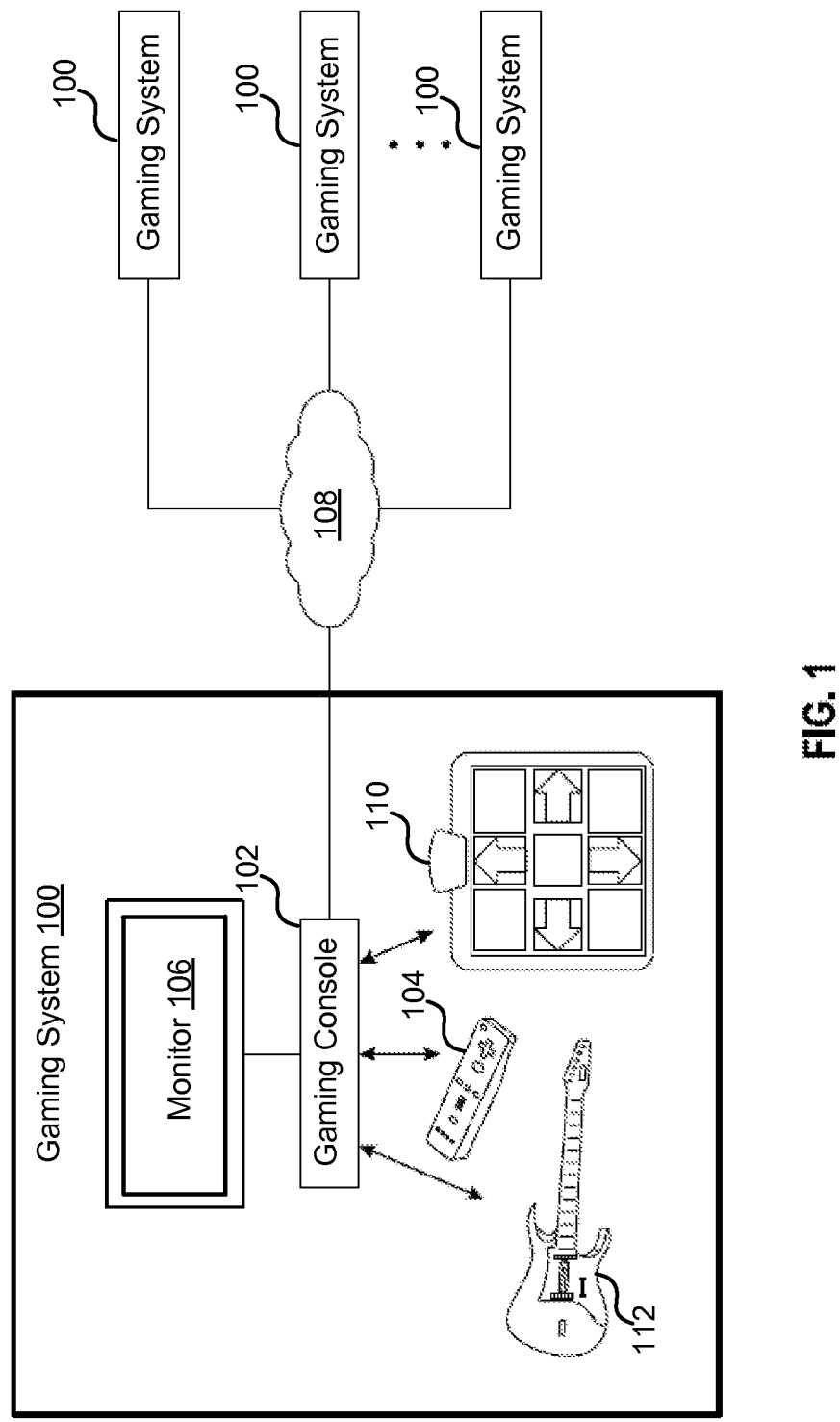
FIG. 1 is a block diagram illustrating a generalized version of a gaming system as one example of an environment with which various embodiments can be implemented.

The figures are not intended to be exhaustive or to limit various embodiments to the precise form disclosed. It should be understood that various embodiments can be practiced with modification and alteration, and that embodiments may be limited only by the claims and the equivalents thereof.

DETAILED DESCRIPTION

Various embodiments described herein are directed toward input mechanisms, for input devices (e.g., handheld input devices), configured to receive and removably couple to interchangeable elements, input devices, including handheld input devices, applicable to some embodiments my include, without limitation, computer controllers, video game controllers, and handheld video gaming devices. Input mechanisms applicable to various embodiments may include, for example, control sticks (e.g., joysticks or analog sticks operable by a users finger, such as a thumbstick), buttons, switches, and directional pads. According to some embodiments, an input mechanism is provided comprising a base component, and an interchangeable element configured to removably couple to the base component. Depending on the embodiment, coupling different interchangeable elements to the base component may cause the input mechanism to vary in size, appearance, contour, shape, texture, or material, and may vary or alter the features provided by the input mechanism.

According to various embodiments, an input mechanism, such as directional pad input mechanism, or thumbstick input mechanism, is provided. The input mechanism may be configured to be integrated into a handheld control device, such as handheld video gaming console or a video game or computer controder. Additionally, the input mechanism may have an interchangeable input element, such as a directional pad button or a thumbstick element, that is removably coupled to the input mechanism, possibly at designated coupling point disposed on the input mechanism (e.g., at a socket). The interchangeable element may be coupled to the input mechanism such that the interchangeable element can be decoupled from the input mechanism and optionally replaced by another interchangeable element similar or different in nature. For example, in some embodiments, the interchangeable element can he an element that is differs one or more aspects in comparison to the element being replaced. Certain embodiments may include a handheld control device incorporating such input mechanisms as those disclosed herein.

The base component may comprise mechanical and/or electronic components that facilitate generation of or affect control instructions or signals from the input mechanism to the input device to which it the input mechanism is coupled. The base comment can include, for example, a potentiometer or encoder for a thumbstick or joystick, a switch for button, a series of switches for a D-pad, or other base component.

The interchangeable element may couple to the base component at a coupling point, which may be disposed on or extend through an exterior surface of the base component. Depending on the embodiment, the base component may be an integrated component of an input device. As part of the coupling mechanism, the coupling point may comprise an attachment/retention mechanism utilizing one or more different methodologies to attach the interchangeable element to, and allow detachment of the interchangeable element from, the base component. There are a number of mechanisms that can be used to allow releasable attachment. Examples of attachment/retention mechanisms may include, for instance, friction based mechanisms, socket and plug mechanisms, or fasteners (e.g., screws, clasps, tabs, clips, etc.).

Through the use of certain embodiments, an input device, such as a video game controller, may be reconfigured or customized for various purposes. One such purpose is to suit a user's (e.g., gamer's preferences with respect to use, feel, appearance, features or performance of the input device. A user may, for instance, interchange an element of an input mechanism to adjust the shape/contour, dimensions, look, feel, material, or performance of one or more the input mechanism elements. Take for instance a thumbstick element coupled to a thumbstick input mechanism of a video game console controller. A user may change the contour shape of the thumbstick element of the thumbstick, input mechanism by interchanging/replacing a concave thumbstick element with a convex thumbstick element; change the dimensions by interchanging/replacing a thumbstick element of given length with a taller or shorter thumbstick element; change the look of the thumbstick element by interchanging/replacing an opaque thumbstick element of one color (e.g., red) with a semi-translucent thumbstick element of another color (e.g., green); or change the feel by interchanging/replacing a smooth, plastic thumbstick element for a thumbstick element including a surface that has an enhanced grip for finger (e.g., covered by an elastomer, neoprene, or textured material).

Before describing various embodiments in detail, it is useful to describe a few example environments with which certain embodiments can be implemented. One such example is that of a computing system, such as a gaming system, used by one or more participants, such as video game players (gamers), to participate in a group activity, such as playing a computer game or video game.

FIG. 1 illustrates a generalized version of a gaming system 100 as one example of an environment with which various embodiments can utilized or implemented. Referring now to FIG. 1, the example gaming system includes a gaming console 102, a monitor 106, a dance pad game controller 110, and a musical-instrument game controller 112. Both dance pad game controller 110 and musical-instrument game controller 112 are provided in this example in addition to handheld game controller 104. The illustrated example also includes an interlace to a communication medium or communication network 108 such as, for example, the Internet or other communication channel. Both the handheld game controller 104 and the musical-instrument game controller 112 are example of handheld control device with which various embodiments described herein may be utilized.

In one environment, gaming console 102 might be implemented as a PlayStation®, Xbox360®, Wii® or other like gaming console. In another imlementation, gaming console 102 might be implemented as a personal computer or other like computing device, A gaming console 102 would typically include a processor or other computing device providing the ability to allow gaming applications, which are typically software applications, to be run thereon. A gaming application might be installed, for example, through the use of CD ROM drives, DVD drives, Ethernet or WiFi download, or other storage medium or communications interfaces. Typically, a gaming console 102 can be analogized to a computer or computing system used to run the gaming software. In another environment, the gaming console 102 might be implemented as a personal computer, laptop, tablet, or other computing device.

A monitor 106 or other display is typically provided to allow the gaming environment to he displayed to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106. In the alternative, a video projector or other viewing mechanism (not shown) can be utilized in place of the monitor 106 to provide similarity display functionality.

As illustrated, speakers can also be provided, separately or with monitor 106, to provide audible information to the gamer daring game play and during set up. For example, in one embodiment, monitor 106 might be implemented as a television with built in speakers that is connected to the gaming console via a coaxial or other audio and video input.

Also illustrated in the example environment is handheld gaming controller 104 that can be used to allow gamers to provide input to the console and to the game software as well as to receive feedback from the console and game software during set up and game play. As described in the background section, handheld gaming controller 104 can include, for example, X, Y, A, B buttons, triggers, analog joysticks, key pads, and other devices to allow the user to provide input to the game. Thus by actuating the various buttons, switches or joysticks, the gamer can control the operation of the game or control characters or vehicles in the game. The interface between gaming console 102 and handheld gaming controller 104, dance pad game controller 110, and musical-instrument game controller 112 might be either a wired and/or wireless interface, as may be desired. Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the Internet or other network or communication medium whereby game information can be downloaded from or uploaded to various websites, online services such as Xbox Live™, or other entities or services. In addition, through a communication medium 108, garners might compete amongst other garners at their gaming systems 100, even if such other gamers at remote or distant locations. Note that depending on the gaming environment, remote gaming systems 100 might or might not have similar configurations to one another.

Although not depicted, game system 100 can have feedback devices, or stimulus, that can be used to provide sensor feedback from the gaming console to the user. The game system 100 can also have biosensors allowing for biological information (e.g., biometrics) regarding the user to be provided to the console. Both the biosensors and feedback devices can communicate to the gaming console 102 via a separate communication path from the controllers 104, 110, and 112. For example, feedback devices can communicate through the USB ports or like communication ports as those found on gaming consoles such as the XBOX 360®, PlayStation® and personal computing system. Biosensors and feedback devices can also be configured to connect through ports of handheld gaming consoles 102, often referred to as expansion ports. As a further example, biosensors and feedback devices can communicate with gaming consoles 102 via wireless communication interfaces.

In yet another embodiment, feedback devices and biosensors can communicate with the gaming console via a communication path through the handheld gaming controller 104. For example the communication controller can be equipped with another communication interface and the biosensors, feedback devices, or both are communicatively coupled (whether hard wired or wirelessly) to the handheld gaming controller 104. As one significant example of this case, a biosensor and feedback device can be configured for communicative coupling to a Nintendo® Wii® controller via the Wii controller's Wii Nunchuck pass-through port. As these examples serve to illustrate, there are a number of mechanisms by which a biosensor or feedback device can be interfaced to a controller or to the gaming console.

Those of ordinary skill in the art will appreciate that various embodiments described herein may be used in conjunction with video game controllers, such as controllers 104 and 112, and with handheld video gaming device that share features similar to those of the game system 100 and its various devices (e.g., handheld gaming controller 104).

Figure 2:
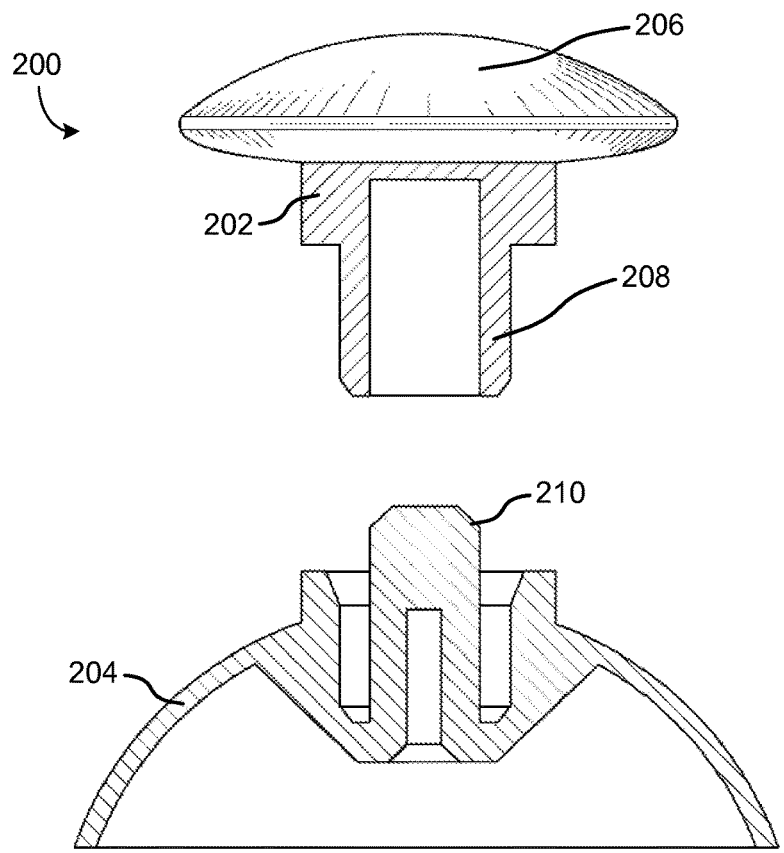
FIG. 2 is a diagram providing a cross-sectional view of an example input mechanism comprising an interchangeable thumbstick element decoupled from a base component in accordance with various embodiments.

FIG. 2 provides a cross-sectional view of an example input mechanism 200 in accordance with one embodiment of the systems and methods described herein. Referring now to FIG. 2, this example includes an interchangeable thumbstick element 202 decoupled from a base component 204. As shown, the interchangeable element 202 of FIG. 2 is a thumbstick element having a concave contact surface 206 (e.g., button head), which is generally configured to come in contact with a user's finger (e.g., thumb tip) when in use by the user. For some embodiments, the interchangeable thumbstick element 202 is considered to have a short shaft in comparison to other interchangeable thumbstick elements.

To facilitate removable coupling between the interchangeable thumbstick element 202 and the base component 204, the interchangeable thurnbstick clement 202 includes a socket 208 configured to receive a plug 210 embedded in the base component 204. Those skilled in the art will appreciate that for some embodiments, the socket 208 may be embedded in the base component 204 while the thumbstick element 202 includes the plug 210. The dimensions of the socket and the plug are chosen such that element 202 can be releasably attached to base 204. For example, in one embodiment, the cross-sectional diameter of plug 210 and the diameter of socket 208 are sized such that plug 210 fits snugly into socket 208. In other embodiments, the sidewalls of socket 208 are dimensioned such that they provide a snug fit with the gap around plug 210. Preferably, the dimension are such that the device fits snugly enough to not fall off or otherwise become easily dislodged by normal game play. On the other hand, the dimensions are also chosen so that element 202 can be separated from base 204 with the application of a pulling force applied by the user so as to allow for interchangeability. Ideally, the force required to separate the components is no greater than the amount of force that would result in breakage or destruction of either or both components.

A user may couple the interchangeable thumbstick element 202 with the base component 204 by inserting the plug 210 into the socket 208 using reasonable force, For example, the user may push the interchangeable thumbstick element 202 and the base component 204 together until they are seated. The components may also be decoupled using reasonable force. For example, the user pulls the element 202 from base 104 to remove the element 202 from the base 204, in one embodiment, the force required to separate element 202 from base 104 is the force that can be exerted by an average teenager, or by an average adult. In another embodiment, the force required to separate element 202 from base 104 is the force that can be exerted by a typical five-year old. In other embodiments, to avoid choking hazards, the three required to remove the element 202 from the base 204 is greater than that force that a young child is able to apply (such as, for example, the force that can be applied by an average 3 or 4 year old). As would be apparent to one of ordinary skill in the art after reading this description, the components can be dimensioned or otherwise configured to require other levels of force to separate the components.

Figure 3:
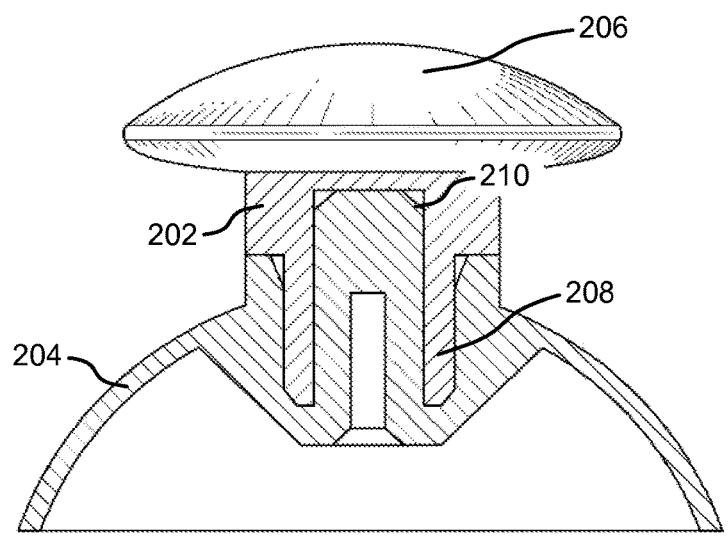
FIG. 3 is a diagram providing a cross-sectional view of an example input mechanism comprising an interchangeable thumbstick clement coupled to a base component in accordance with various embodiments.

FIG. 3 provides a cross-sectional view of the example input mechanism 200 with the interchangeable thumbstick element 202 and the base component 204 in a coupled configuration.

Those skilled in the art will appreciate that attachment mechanisms other than sockets and plugs may be utilized to removably couple the interchangeable element 202 to the base component 204. Additionally, those skilled in the art will understand that for some embodiments, the attachment mechanism employed may utilize or require one or more tools to facilitate attachment or detachment of the interchangeable element 202 and the base component 204.

Figure 4:
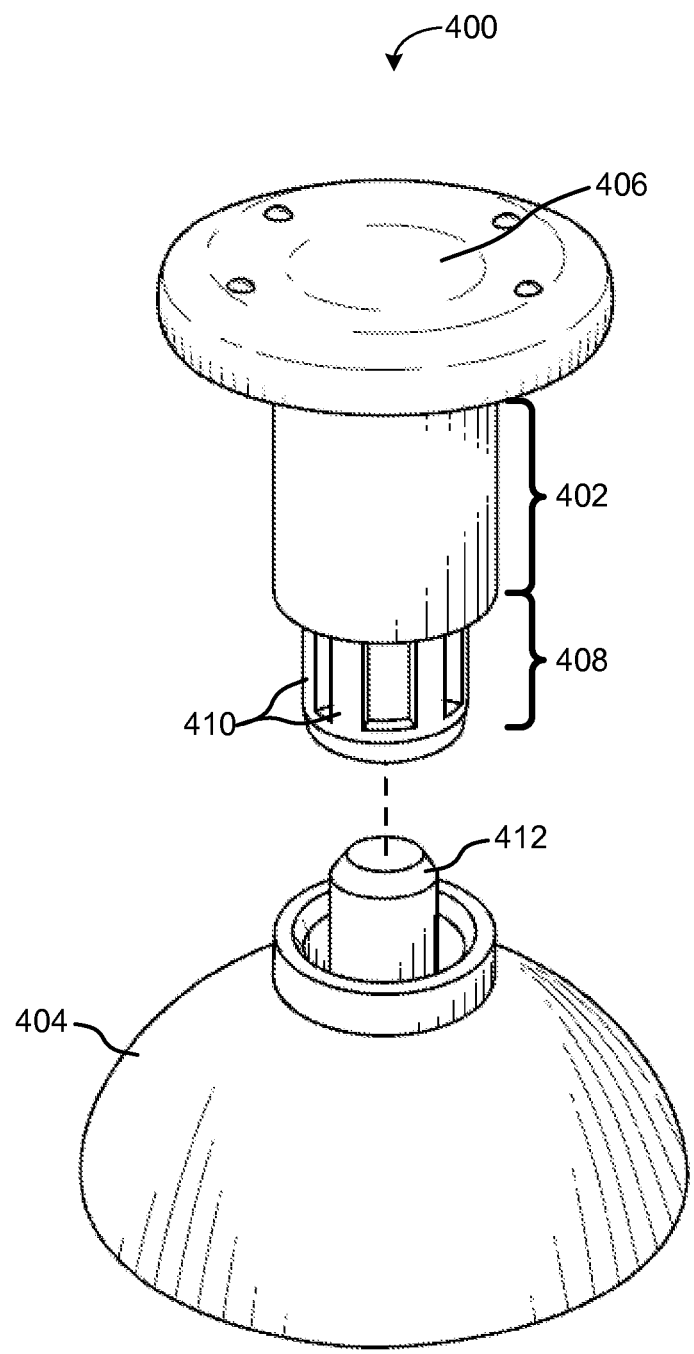
FIG. 4 is a diagram providing a top-perspective view of an example input mechanism comprising an interchangeable thumbstick element decoupled from a base component in accordance with various embodiments.
Figure 5:
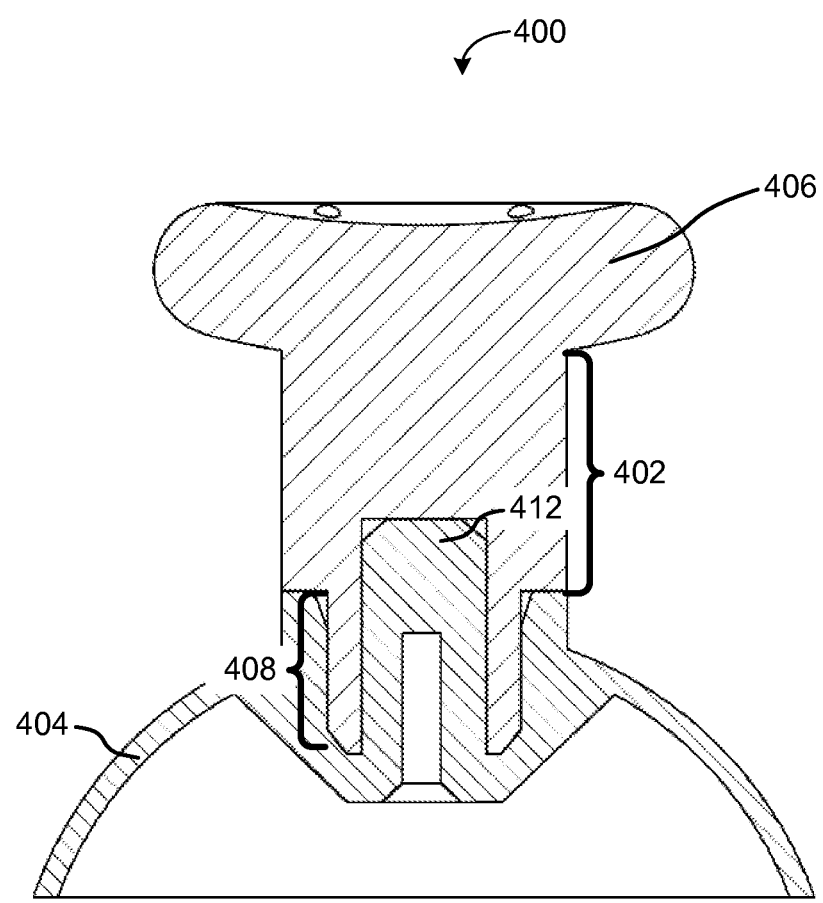
FIG. 5 is a diagram providing a cross-sectional view of an example input mechanism comprising an interchangeable thumbstick element coupled to a base component in accordance with various embodiments.

FIG. 4 provides a top-perspective view of an example input mechanism 400 in accordance with one embodiment of the systems and methods described herein. The example illustrated in FIG. 4 comprises an interchangeable thumbstick 402 element decoupled from a base component 404. As shown, in this example the interchangeable element 402 is a thumbstick element having a convex contact surface 406, which is generally configured to come in contact with a users finger (e.g., thumb tip) when in use by the user. For some embodiments, the interchangeable thumbstick element 402 is considered to have a tall shaft in comparison to other interchangeable thumbstick elements. To facilitate removable coupling between the interchangeable element 402 and the base component 404, the interchangeable element 402 includes a socket 408 configured to receive a plug 412 embedded into the base component 404. A user may couple the interchangeable thumbstick element 402 with the base component 404 by inserting the plug 412 into the socket 408 using reasonable force (e.g., pushing the interchangeable thumbstick element 402 and the base component 404 until they snap together). FIG. 5 provides a cross-sectional view of the example thumbstick input mechanism 400 once the interchangeable thumbstick element 402 and the base component 404 are coupled together. To further secure the coupling between the socket 408 and the plug 412, the socket walls may further include friction beads 410, configured to increase adhesion between the socket 408 walls and the plug 412 walls.

In the illustrated example, friction beads 410 are longitudinal bars or ridges projecting from the surface of the outer wall of socket 408. These friction beads 410 provide additional friction to maintain the releasable connection between base 404 and element 402. Although friction beads 410 in this example are illustrated as longitudinal bars extending substantially axially along the surface, friction beads 410 can be provided in other shapes and configurations. For example, friction beads 410 can be bars or protuberances aligned in other directions such as diagonally along the surface, helically around the surface or as latitudinal rings about the circumference of the outer surface of the socket wall. As another example, friction beads 410, can be provided in patterns such as sinusoidal, circular, or any other pattern. Addifionally, friction beads 410 can be other than the linear examples described above. For example, friction beads 410 can be any pattern of shapes or protuberances about the surface to provide the desired amount of friction to allow releasable attachment with a desired level of force. For example, a pattern of protruding hemispheres, pyramids, cubits, or various polyhedral or other shapes. Additionally, although illustrated on outer surface of socket 408 wall, friction beads 410 can be provided on any or all of the various mating surfaces of the plug and socket.

In addition to or in place of friction beads 410, various surface materials, surface treatments or other imparted surface properties can be used to affect the amount of friction presented by the coupling. For example, high coefficient-of-friction materials can be used for any or all of the various mating surfaces of the plug and socket. Such surfaces can be provided, for example, by using rough or abraded surfaces, by using polymeric or rubber-like surface materials or other materials providing a desired coefficient of friction.

Those skilled in the art will appreciate that, in addition to friction beads or friction surfaces, other methods of adhesion may be utilized to secure the socket 408 to the plug 412. Likewise, other attachment mechanisms other than sockets and plugs may be utilized in removably coupling the interchangeable element to the base component. For example, barbs, snap-tabs, click lock or other like 'snap-fits' components could be used to provide a releasable coupling. As further examples, threaded connectors can be used for screw on/off releasable connection, as can twist & lock fastening mechanisms of various configurations.

Decoupling the interchangeable element from the base may involve using reasonable force to detach the components (e.g., in the example of FIG. 4, pulling the interchangeable thumbstick element 402 and the base component 404 away from each other). As described above, the coupling mechanism can be chosen and implemented to provide the requisite level of force for decoupling. For example, in some embodiments it would be undesirable to have the element decouple with the application of such small forces that the element detaches during normal use or in unwanted circumstances. As a further example, in a gaming application it would be undesirable for the interchangeable element to detach from the base component as a result of forces imparted on the assembly during normal game play. Likewise, it may be undesirable for the interchangeable element to be capable of being detached from the base component by a small child especially in applications where the detachable element presents a choking hazard.

For some embodiments, the base component 404 and the plug 412 are similar to that of base 204, such that the base component 404 can compatibly receive and couple to either the convex thumbstick element 402 of FIG. 4 or the concave thumbstick element 202 of FIG. 2 (based on user preference). More importantly, in various embodiments one or more base components on a device or controller use a common coupling interface with each other. Likewise, multiple interchangeable elements use a common coupling interface complementary to the coupling interface on the base(s). In this manner, each of these base components can accept each of the compatible interchangeable elements, allowing flexibility of customization.

Figure 6A:
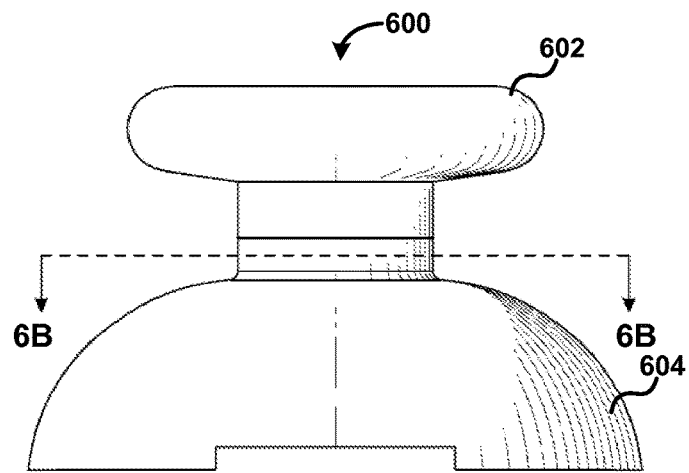
FIGS. 6A and 6B are diagrams providing a side view of an example input mechanism comprising an interchangeable thumbstick element coupled a base component in accordance with various embodiments, and a cutaway view of the base component.
Figure 6B:
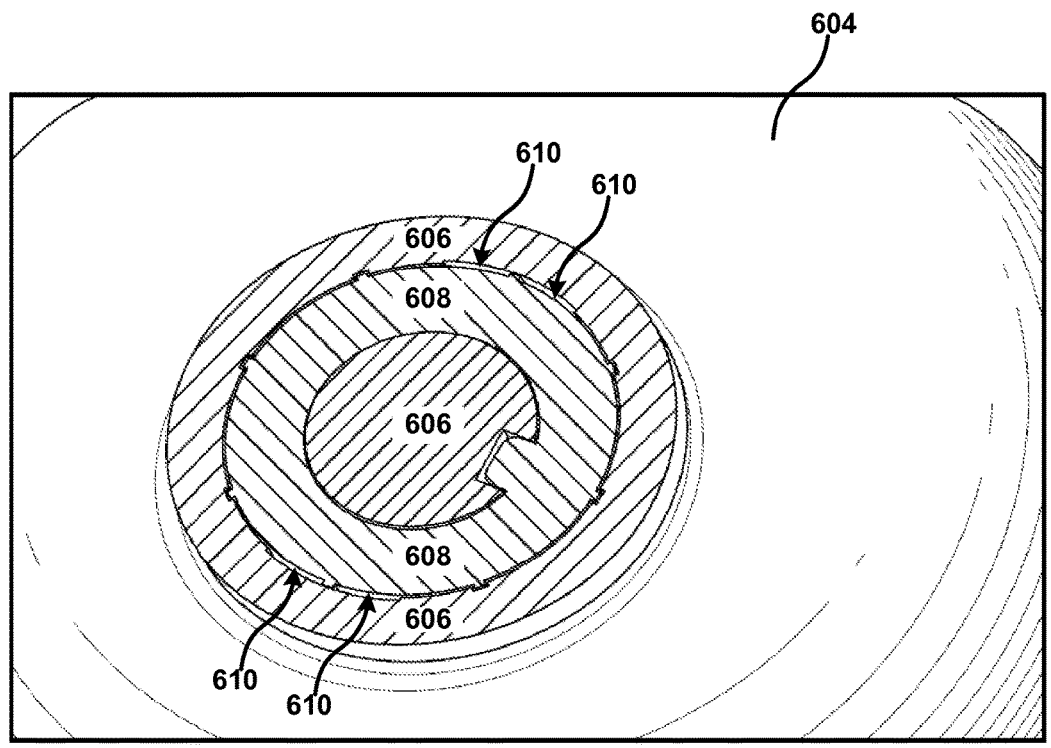

FIG. 6A provides a side view of an example input mechanism 600, in accordance with one embodiment of the systems and methods described herein. In the illustrated example, input mechanism 600 includes an interchangeable element 602 and a base component 604. In this example, interchangeable element 602 is a thumbstick, although other elements could be used. A coupling mechanism may be included with the base component 604 to enable the thumbstick interchangeable element 602 to couple to the base component 604. For some embodiments, the coupling mechanism may comprise a socket configured to receive a plug disposed on the thumbstick interchangeable element 602, or the coupling mechanism may comprise a plug configured to be received by a socket disposed on the thumbstick interchangeable element 602. FIG. 6B provides a cutaway view of what the base component 604 may look like after a plug 606 is joined to a socket 608, thereby coupling the thumbstick interchangeable element 602 to the base component 604.

According to some embodiments, the socket 608 may be disposed on the thumbstick interchangeable element 602 while the plug 606 may be disposed on the base component 604. As shown in FIG. 6A, the plug 606 may be embedded into the outer surface of the base component 604. Alternatively, the socket 608 may be disposed on the base component 604 while the plug 606 may be disposed on the thumbstick interchangeable element 602. Though FIG. 6B illustrates the use of plug and socket elements in coupling the interchangeable element 602 to the base component 604, some embodiments may utilize alternative elements in facilitate the coupling between the interchangeable element 602 to the base component 604.

As depicted in FIG. 6B, the base component 604 in some embodiments may include one or more openings 610 configured to allow the passage of air as the thumbstick interchangeable element 602 is coupled to and decoupled from the base component 604. The openings 610 may be disposed at a coupling point where the base component 604 joins with the thumbstick interchangeable element 602, as shown in FIG. 6B, or may be disposed at other locations that can facilitate passage of air between the thumbstick interchangeable element 602 and the base component 604.

For some embodiments, the openings 610 prevent or reduce the likelihood of a vacuum forming between the thumbstick interchangeable element 602 and the base component 604 as the two are decoupled. This could be helpful for some embodiments where the formation of a vacuum between the thumbstick interchangeable element 602 and the base component 604 would otherwise make decoupling of the two mare difficult. In some embodiments, where a vacuum is utilized to couple the thumbstick interchangeable element 602 to the base component 604, such opening may be absent from the base component 604 and/or the thumbstick interchangeable element.

Figure 7:
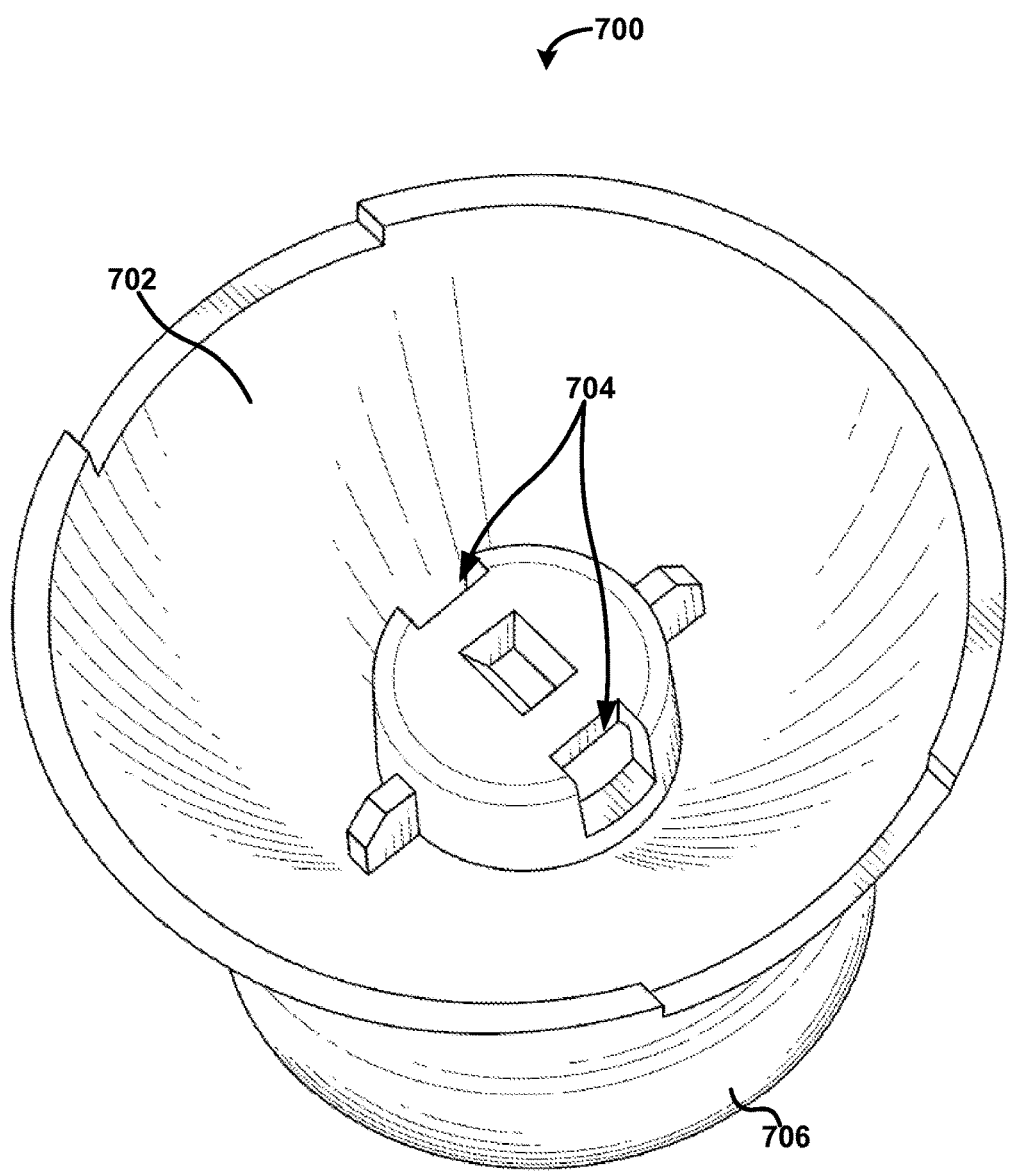
FIG. 7 is a diagram providing a bottom-perspective view of an example input mechanism comprising an interchangeable thumbstick element coupled to a base component in accordance with various embodiments.

FIG. 7 provides a bottom-perspective view of an example input mechanism 700 comprising an interchangeable element 706 coupled to a base component 702 in accordance with one embodiment of the systems and methods described herein. FIG. 7 depicts an input mechanism 700 from the perspective of the underside of the base component 702. In the illustrated example, element 706 is a thumbstick element, however other interchangeable elements could also be used. As shown in the illustrated example, the base component 702 for some embodiments may include one or more openings 704, which like the openings 610 of FIG. 6, may be configured to allow the passage of air as the interchangeable element 706 is coupled to and decoupled from the base component 702. As noted before, such openings may prevent the buildup of pressure between interchangeable element 706 and the base component 702 during coupling. Likewise, one or more openings can help to avoid or reduce the likelihood of a vacuum forming between the interchangeable element 706 and the base component 702 as the two are decoupled.

The openings 704 may be further configured to engage an attachment mechanism to secure the interchangeable element 706 and the base component 702. For example, the openings 704 may be adapted to receive and engage structural features disposed on a coupling member of the interchangeable element 706 to facilitate releasable attachment of the components. By way of further example, spring tabs extending from interchangeable element 706 can be configured to engage with a surface of openings 704 to retain the components in a connected configuration. Likewise, in a twist-lock configuration, slots can be provided in the base 702 to engage posts on interchangeable element 706.

In various embodiments, complementary elements of a locking mechanism can be disposed on the interchangeable element 706 and the base component 702. For instance, one or more tabs may be disposed on the interchangeable element 706, and the tabs may be configured to engage and be received by the openings 704 disposed on the base component 702. Alternatively, in various embodiments, the openings 704 may be disposed on the interchangeable element 706 and the tabs may be disposed on the on the base component 702.

Figure 8:
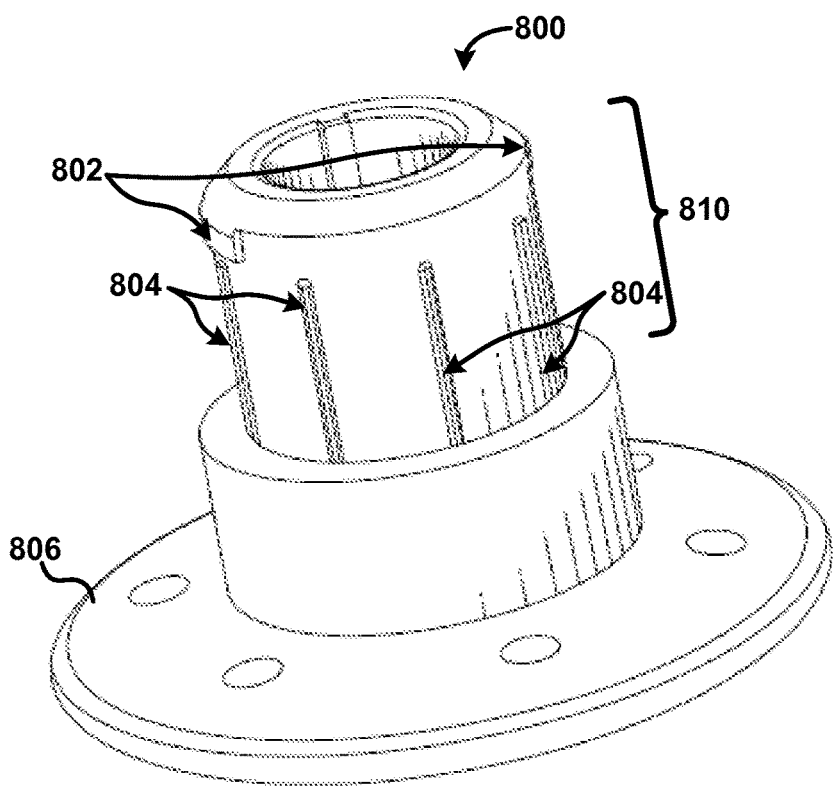
FIG. 8 is a diagram providing a bottom-perspective view of an example thumbstick interchangeable element in accordance with some embodiments.

FIG. 8 providing a bottom-perspective view of an example the thumbstick interchangeable element 800 in accordance with one embodiment of the systems and methods described herein. In this example, thumbstick interchangeable element 800 comprises a thumbstick contact surface 806 and a shaft including a socket 810. The socket 810 includes structural protrusions 802 (e.g, tabs) disposed along the outer rim at one end of the socket 810, and beads 804 disposed along the shaft of the socket 810. As described herein, the structural protrusions 802 may be utilized by an attachment mechanism configured to secure the example thurobstick interchangeable element 800 to a compatible base component (not shown). To receive and releasably secure the structural protrusions 802 to a compatible base component, the base component may be configured to include openings/receptors that complement the structural protrusions, possibly in the form of through holes. As also described herein, the beads 804 may be disposed on the socket 810 of the first interchangeable element, such that the beads 804 contribute to the adhesion between the socket 810 and the plug of the base component to which it is coupled. Though FIG. 8 depicts an interchangeable element 800 as a thumbstick, the interchangeable element 800 may comprise other forms of input elements including, without limitation, joysticks, buttons, switches, and the like.

Figure 9:
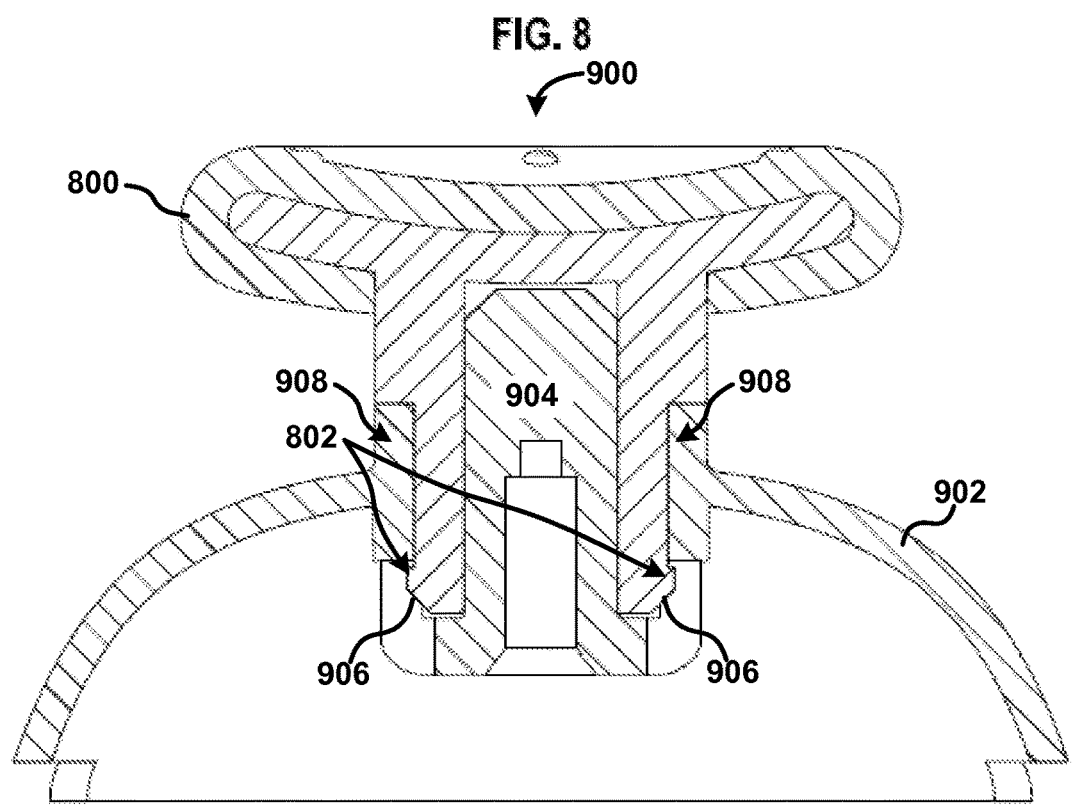
FIG. 9 is a diagram providing a cross-sectional view of an example input mechanism comprising an interchangeable thumbstick element coupled to a base component in accordance with various embodiments.

For example, FIG. 9 provides a cross-sectional view of an example thumbstick input mechanism 900, in accordance with some embodiments, comprising a base component 902, the plug 904, and the thumbstick interchangeable element 800 of FIG. 8, coupled to the base component 902. As shown in FIG. 9, the structural protrusions 802 disposed on the thumbstick interchangeable element 800 allow the thumbstick interchangeable element 800 to secure itself to the base component 902. For example, the base component 902 may include one or more openings/receptors 906 configured to receive and engage the structural protrusions 802 of the thumbstick interchangeable element 800, thereby allowing the thumbstick interchangeable element 800 to be releasably coupled and secured to the base component 902. The openings/receptors 906 may be disposed in outer walls 908 of the opening where the base component 902 receives the socket 810 and structural protrusions 802 of element 800.

According to the some embodiments, the base component 902, in turn, may be coupled to mechanical and/or electronic components that translate the movement of the thumbstick input mechanism to input control information for a handheld control device.

Figure 10:
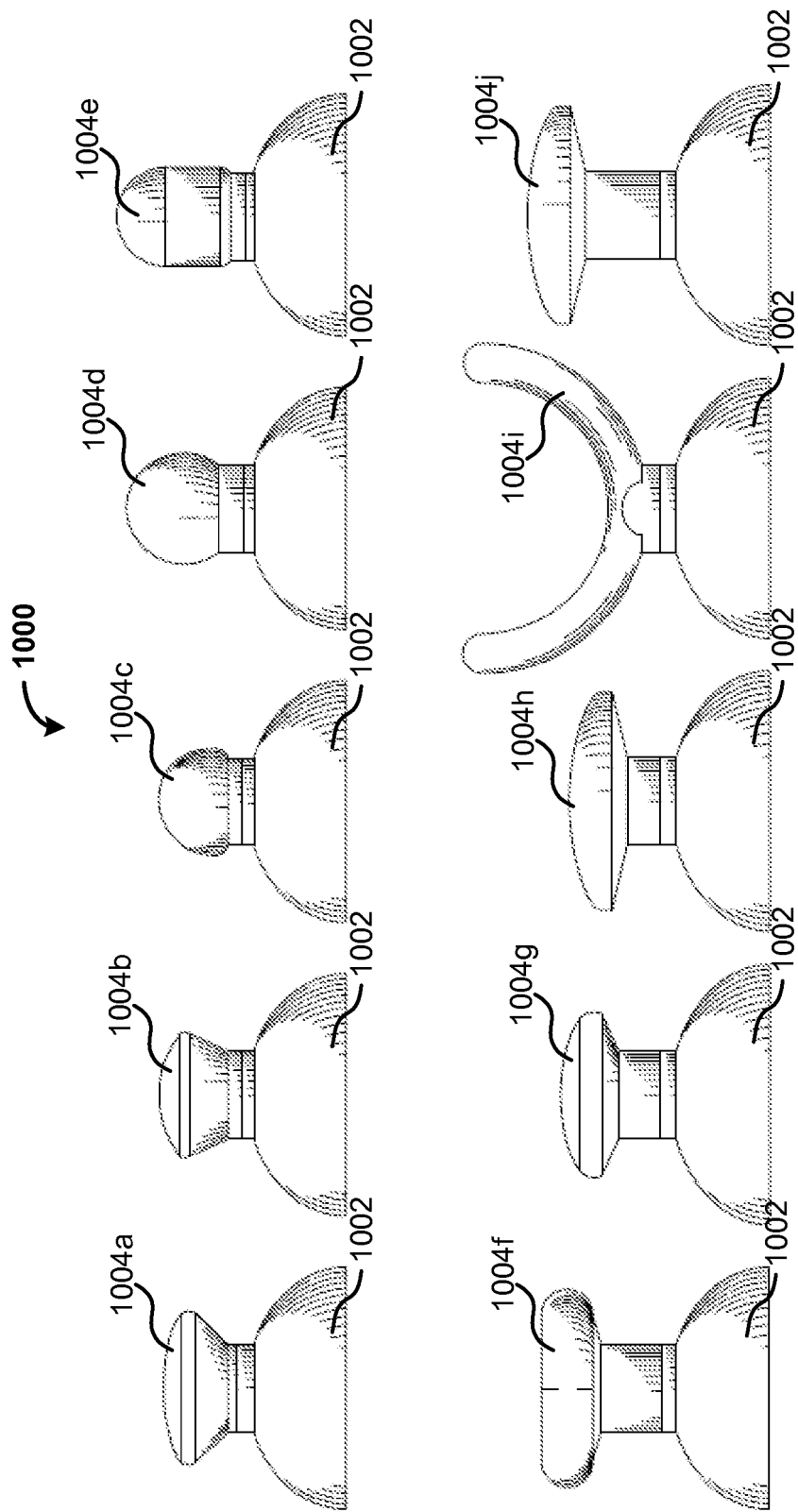
FIG. 10 depicts example configurations for an input mechanism comprising a common base component coupled to different interchangeable thumbstick elements in accordance with various embodiments.

FIG. 10 provides example configurations 1000 of various input mechanisms in accordance with one embodiment of the systems and methods described herein. In the examples illustrated, each of the configurations 1000 may comprise a common base component 1002 coupled to a different interchangeable thumbstick element (1004a-j) in accordance with various embodiments. As shown in FIG. 10, the interchangeable thumbstick elements 1004a-j may vary in size, shape, or dimensions. Those skilled in the art will appreciate that elements 1004a-j do not necessarily have to be thumbsticks but, rather, could function as other forms of input elements including, without limitation, joysticks, buttons, switches, and the like. Those skilled in the art will also appreciate that the interchangeable thumbstick elements 1004*a-j* may vary in their outer materials, color, or transparency.

For instance, one or more of the interchangeable thumbstick elements 1004*a-j* may include an exterior surface comprising an elastomer, neoprene, or textured material, which can enhance grip for a user's finger. Using one or more of the input mechanism configurations 1000 with an input device may enable or otherwise enhance a particular user's ability to provide physical input to the input device. Those skilled in the art will appreciate that for some embodiments, the interchangeable thumbstick elements may comprise mechanical components that enable the input mechanism to provide additional features (e.g., input features or comfort-related features) to the user. For instance, a given interchangeable thumbstick element may include a button the thumbstick, or the thumbstick to be multi-jointed (e.g., easier accessibility or greater range of motion). Those skilled in the art will also appreciate that for various embodiments, an interchangeable element may comprise one or more coupling features that enable the interchangeable element to couple to input mechanisms of different input devices. For example, the interchangeable element may be configured to couple with an input mechanism of a Sony® Playstation® input device and be configured to couple with an input mechanism of a Microsoft® XBOX360® input device.

Figure 11:
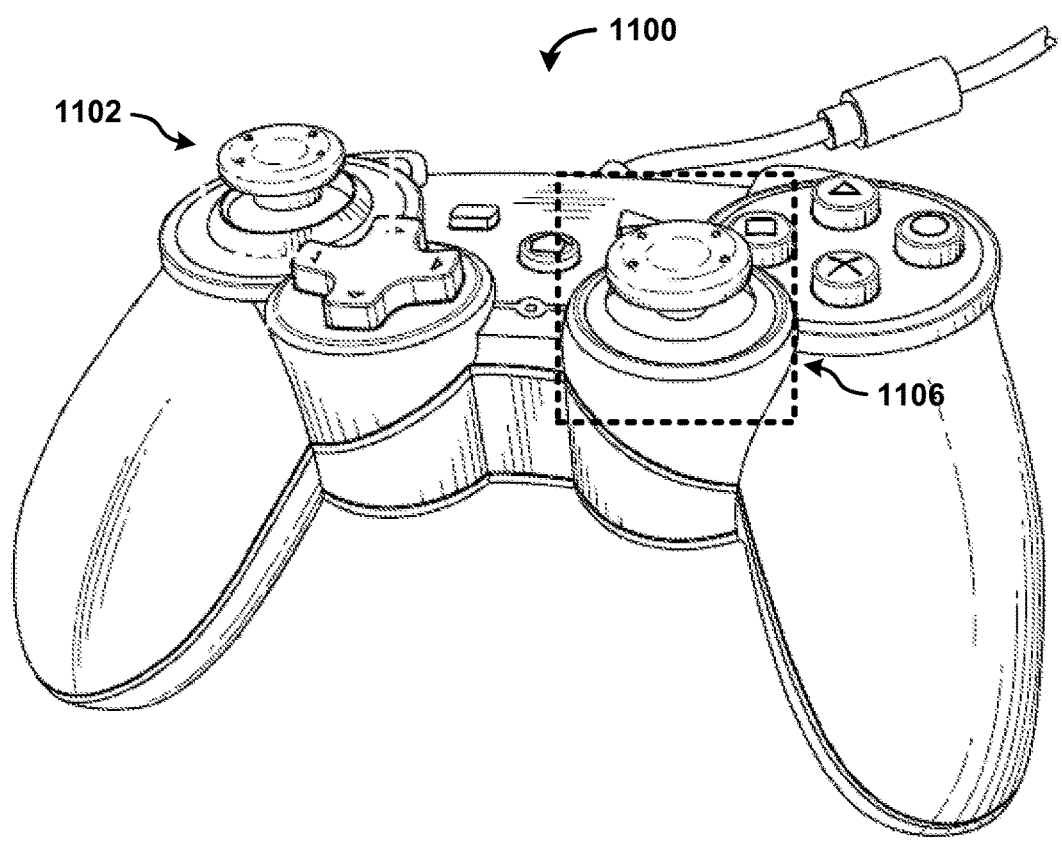
FIG. 11 depicts an example video game controller comprising at least one input mechanism that comprises an interchangeable thumbstick element coupled to a base component in accordance with various embodiments.
Figure 12:
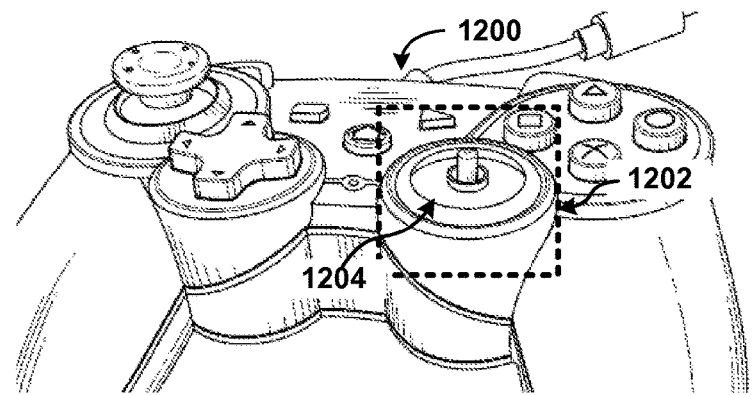
FIG. 12 depicts an example video game controller comprising an input mechanism that includes a base component configured to receive an interchangeable element in accordance with various embodiments.

FIG. 11 provides an example video game controller 1100, in accordance with various embodiments, comprising at least one input mechanism 1102, 1104, or 1106 that comprises an interchangeable thumbstick element, coupled to a base component. For example, as shown in FIG. 12, an example video game controller 1200 comprises an input mechanism 1202 that includes a base component 1204 configured and ready to receive a compatible interchangeable element. As also shown, the base component 1204 may comprise a plug component configured to couple with a socket of the compatible interchangeable element.

Figure 13:
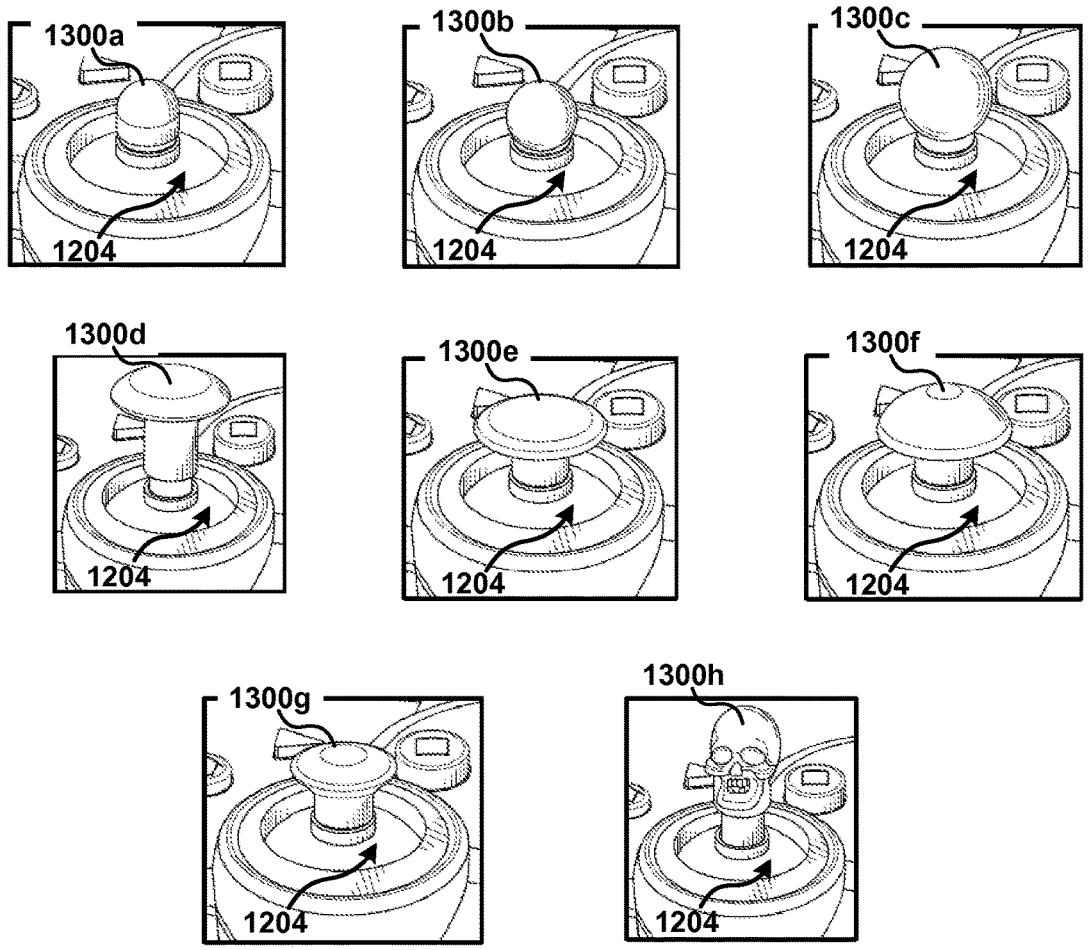
FIG. 13 depicts example configurations for an input mechanism, coupled to a video game controller, comprising a common base component coupled to different interchangeable thumbstick elements in accordance with various embodiments.

FIG. 13 depicts different configurations of the input mechanism 1202 comprising the base component 1204 and different in er interchangeable elements 1300*a-h*. As shown in FIG. 13, for some embodiments, an interchangeable element may include structural features that cause the interchangeable element to resemble objects that aesthetically please the user. For instance, the interchangeable th element 1300*h* is configured to resemble a skull and once coupled to the base component 1204, causes the video game controller 1100 to appear as if the skull is mounted to the controller.

Figure 14:
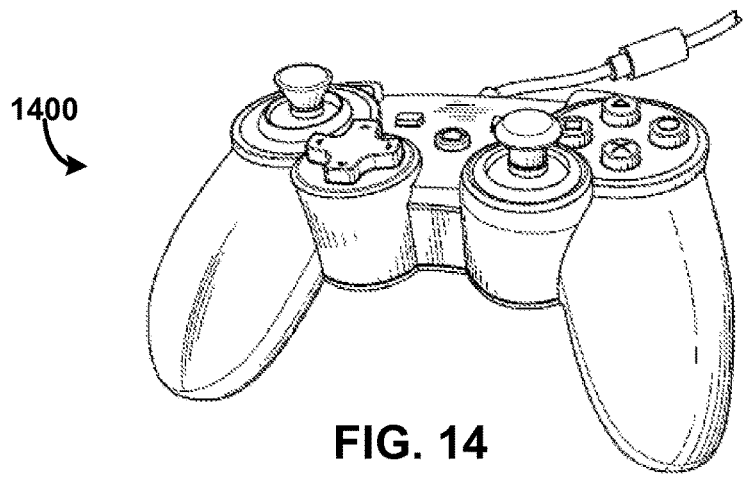
FIGS. 14-16 depict example video game controllers comprising input mechanisms that comprise base components coupled to different interchangeable thumbstick elements in accordance with various embodiments.
Figure 15:
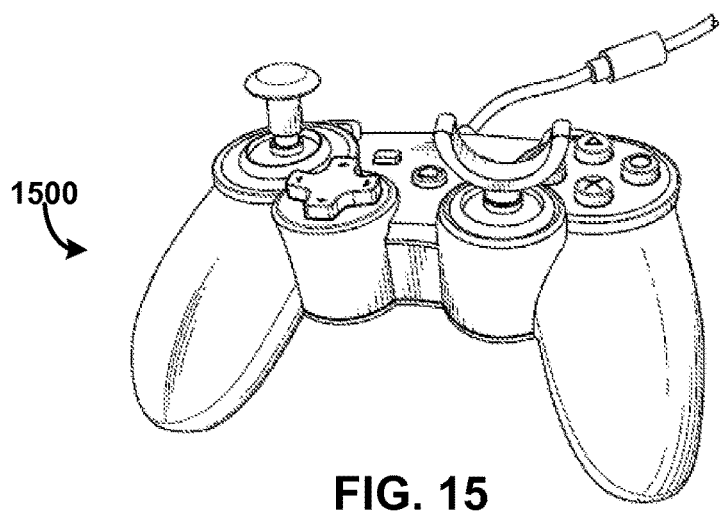
Figure 16:
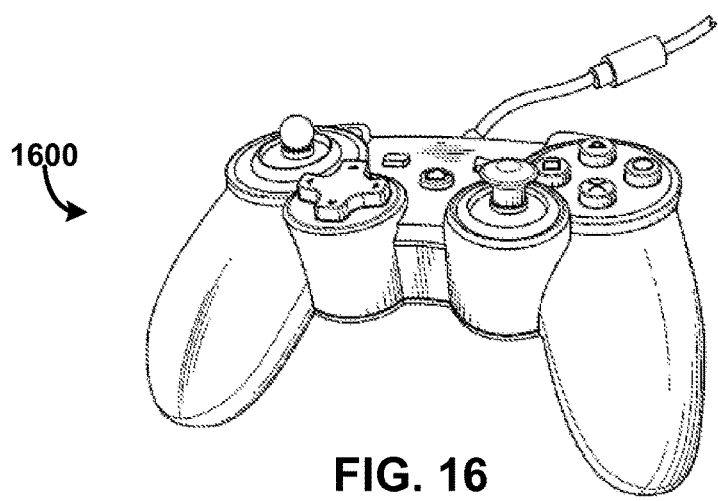

FIGS. 14-16 provide example video game controllers 1400, 1500, and 1600, in accordance with various embodiments, comprising inputmechanisms that comprise base components coupled to different interchangeable thumbstick elements. In particular, each of the video game controllers 1400, 1500, and 1600 as shown comprises two input mechanisms having different interchangeable elements it accordance with some embodiments. By using such embodiments, users can customize different input mechanisms of a given video game controllers 1400, 1500 or 1600 with dissimilar interchangeable elements that provide comfort, ergonomics, or enhanced controllability to a given user.

While various embodiments have been described above with respect handheld video gaming device, it should be understood that they have been presented by way of example only, and not of limitation. Those of ordinary skill in the art would appreciate that some embodiments may include other handheld control device comprising having input mechanisms, and may include handheld control devices used in non-gaming contexts/environments (e.g., control of unmanned aerial vehicles [UAVs], unmanned ground vehicles, oraemote control [R/C] vehicles).

Likewise, the various diagrams may depict an example architectural or other configuration for the invention(s), which is done to aid in understanding the features and functionality that can be included in the invention(s). The invention(s) are not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention(s). In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention(s) are described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention(s), whether or not such embodiments are described and whether or not such features are presented as being a part of a described embodiment.

Thus, the breadth and scope of the present invention(s) should not be limited by any of the above-described example embodiments.

Terms and phrases used in this document, and variations thereof, unless otherwise expressly stated, should be construed as open ended as opposed to hunting, As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

We claim:

1. An input mechanism for an input device, the input mechanism comprising:

a base component configured to couple to the input device and comprising a coupling mechanism, wherein the base component is an integrated component of the input device; and a first interchangeable element configured to releasably attach to the coupling mechanism, and configured to receive an input from a user;

wherein the coupling mechanism is configured to couple the first interchangeable element to the base component such that the first interchangeable element can be decoupled from the base component and a second interchangeable element can be coupled to the base component in place of the first interchangeable element;

wherein the coupling mechanism comprises an aperture configured to prevent a vacuum from forming in the coupling mechanism when the first interchangeable element is being decoupled from the base component.

2. The input mechanism of claim 1, wherein the first interchangeable element and the second interchangeable element differ in appearance, material, physical dimension, shape, or input feature provided.

3. The input mechanism of claim 1, wherein the base component is further configured to translate the input to a corresponding input instruction provided to the input device.

4. The input mechanism of claim 1, wherein the first interchangeable element comprises a control stick optimized for use by an appendage of the user's hand.

5. The input mechanism of claim 4, wherein the control stick comprises a cradle configured to support the appendage of the user's hand.

6. The input mechanism of claim 4, wherein the control stick is a thumbstick.

7. The input mechanism of claim 1, wherein the input mechanism comprises a joystick, an analog stick, or a directional pad.

8. The input mechanism of claim 1, wherein the input mechanism comprises a button or a switch.

9. The input mechanism of claim 1, wherein the first interchangeable element comprises a concave top surface or a convex top contact surface.

10. The input mechanism of claim 1, wherein the first interchangeable element has a spherical or semi-spherical shape.

11. The input mechanism of claim 1, wherein the coupling mechanism comprises a guide configured to align the first interchangeable element with the base component during coupling.

12. The input mechanism of claim 11, wherein the guide is further configured to align the first interchangeable element in a first orientation with respect to the base component.

13. The input mechanism of claim 1, wherein the coupling mechanism comprises a socket configured to receive a plug disposed on the first interchangeable element.

14. The input mechanism of claim 1, wherein the coupling mechanism comprises a plus configured to be received by a socket disposed on the first interchangeable element.

15. The input mechanism of claim 1, wherein the coupling mechanism comprises a fastener or the coupling mechanism is friction-based.

16. An input device having an input mechanism, the input mechanism comprising:

a base component configured to couple to the input device and comprising a coupling mechanism, wherein the base component is an integrated component of the input device; and a first interchangeable element configured to releasably attach to the coupling mechanism, and configured to receive an input from a user;

wherein the coupling mechanism is configured to couple the first interchangeable element to the base component such that the first interchangeable element can be decoupled from the base component and a second interchangeable element can be coupled to the base component in place of the first interchangeable element;

wherein the first interchangeable element comprises an aperture configured to prevent a vacuum from forming in the coupling mechanism when the first interchangeable element is being decoupled from the base component.

17. The input device of claim 16, wherein the input mechanism comprises a joystick, an analog stick, a digital stick, or a directional pad.

18. The input device of claim 16, wherein the input device is a handheld controller.

19. The input device of claim 16, wherein the first interchangeable element and the second interchangeable element differ in appearance, material, physical dimension, shape, or input feature provided.

20. An input mechanism for an input device, the input mechanism comprising:

a base component configured to couple to the input device and comprising a coupling mechanism, wherein the base component is an integrated component of the input device; and a first interchangeable element configured to releasably attach to the coupling mechanism, and configured to receive an input from a user;

wherein the coupling mechanism is configured to couple the first interchangeable element to the base component such that the first interchangeable element can be decoupled from the base component and a second interchangeable element can be coupled to the base component in place of the first interchangeable element;

wherein the first interchangeable element comprises an aperture configured to prevent a vacuum from forming in the coupling mechanism when the first interchangeable element is being decoupled from the base component.

* * * * *

UNITED STATES PATENT AND TRADEMARK OFFICE
CERTIFICATE OF CORRECTION

| | | |
|---|---|---|
| PATENT NO. | : 9,710,072 B1 | |
| APPLICATION NO. | : 13/848660 | |
| DATED | : July 18, 2017 | |
| INVENTOR(S) | : Bradley M. Strahle et al. | |

It is certified that error appears in the above-identified patent and that said Letters Patent is hereby corrected as shown below:

On the Title Page

Item (71), (Applicants), Change "Bradley M. Strahle, Crestline, CA (US), Eric B. Fulghum, South Pasadena, CA (US)" to --Performance Designed Products LLC, Burbank, CA (US)--.

Item (57), (Abstract) at Line 9, Change "for" to --for example,--.

In the Specification

In Column 2 at Line 20, Change "element." to --element--.

In Column 2 at Line 36, Change "releasahly" to --releasably--.

In Column 3 at Line 56, Change "understandinn" to --understanding--.

In Column 3 at Line 67, Change "or" to --orientation--.

In Column 4 at Line 10, Change "clement" to --element--.

In Column 5 at Line 1, Change "elements, input" to --elements. Input--.

In Column 5 at Line 2, Change "my" to --may--.

In Column 5 at Line 7, Change "users" to --user's--.

In Column 5 at Line 22, Change "controder." to --controller.--.

In Column 5 at Line 32, Change "he" to --be--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,710,072 B1

In Column 5 at Line 32, After "differs" insert --in--.

In Column 5 at Line 41, Change "comment" to --component--.

In Column 5 at Line 42, After "for" insert --a--.

In Column 5 at Line 63, Change "gamer's" to --gamer's)--.

In Column 6 at Lines 3-4, Change "contour shape" to --contour/shape--.

In Column 6 at Line 4, Change "thumbstick," to --thumbstick--.

In Column 6 at Line 35 (approx.), Change "interlace" to --interface--.

In Column 6 at Line 44, Change "imlementation," to --implementation,--.

In Column 6 at Line 46, Change "device," to --device.--.

In Column 6 at Line 59, Change "he" to --be--.

In Column 7 at Line 6, Change "daring" to --during--.

In Column 7 at Line 35, Change "garners" to --gamers--.

In Column 7 at Line 35, Change "garners" to --gamers--.

In Column 7 at Line 41, Change "sensor" to --sensory--.

In Column 7 at Line 60, Change "example" to --example,--.

In Column 7 at Line 64, Change "significant" to --specific--.

In Column 8 at Line 25, Change "thurnbstick clement" to --thumbstick element--.

In Column 8 at Line 49, Change "force," to --force.--.

In Column 9 at Line 20, Change "users" to --user's--.

In Column 9 at Line 22, Change "thurnbstick" to --thumbstick--.

In Column 9 at Line 55, Change "Addifionally," to --Additionally,--.

In Column 9 at Line 61, Change "cubits," to --cubics,--.

In Column 11 at Line 29, Change "clement" to --element--.

CERTIFICATE OF CORRECTION (continued)
U.S. Pat. No. 9,710,072 B1

In Column 11 at Line 31, Change "mare" to --more--.

In Column 12 at Line 12, After "example" delete "the".

In Column 12 at Line 22, Change "thurobstick" to --thumbstick--.

In Column 13 at Line 34, Change "element," to --element--.

In Column 13 at Line 44, After "different" delete "in er".

In Column 13 at Line 48, Change "th" to --thumbstick--.

In Column 13 at Line 54, Change "inputmechanism" to --input mechanism--.

In Column 13 at Line 58, Change "it" to --in--.

In Column 13 at Line 61, Change "1500" to --1500,--.

In Column 13 at Line 65, After "respect" insert --to--.

In Column 14 at Line 6, Change "oraemote" to --or remote--.

In Column 14 at Line 42, Change "hunting," to --limiting.--.

In the Claims

In Column 15 at Line 35, In Claim 7, after "stick," insert --a digital stick,--.

In Column 15 at Line 57, In Claim 14, change "plus" to --plug--.